United States  [11] 3,600,061

| [72] | Inventors | George Harry Heilmeier<br>Philadelphia, Pa.;<br>Louis A. Zanoni, Mercer, N.J. |
|---|---|---|
| [21] | Appl. No. | 809,131 |
| [22] | Filed | Mar. 21, 1969 |
| [45] | Patented | Aug. 17, 1971 |
| [73] | Assignee | RCA Corporation |

[54] ELECTRO-OPTIC DEVICE HAVING GROOVES IN THE SUPPORT PLATES TO CONFINE A LIQUID CRYSTAL BY MEANS OF SURFACE TENSION
4 Claims, 7 Drawing Figs.

[52] U.S. Cl. .................................................. 350/160
[51] Int. Cl. .................................................. G02f 1/16
[50] Field of Search .......................... 350/150, 151, 160, 161, 179, 267, 312, 92, 94, 95, 285; 356/246; 40/28

[56] References Cited
UNITED STATES PATENTS

| 2,062,468 | 12/1936 | Matz | 350/179 UX |
| 2,085,190 | 6/1937 | Gretener et al. | 350/312 |
| 2,155,660 | 4/1939 | Jeffree | 350/161 X |
| 2,439,553 | 4/1948 | Winn | 350/312 X |
| 3,135,207 | 6/1964 | Brown et al. | 350/161 X |
| 3,212,420 | 10/1965 | Juan De La Cierva | 350/285 X |
| 3,415,591 | 12/1968 | Letter | 350/160 |
| 3,435,445 | 3/1969 | Clendinning et al. | 350/150 X |
| 3,440,620 | 4/1969 | French | 340/173 (LC) |
| 3,440,882 | 4/1969 | Jones | 73/356 (LC) |
| 3,517,126 | 6/1970 | Talsuya Yamada et al. | 350/161 X |

OTHER REFERENCES
Davison: " New Infrared Microcell," Journal Of The Optical Society Of America, vol. 45, pg. 227, March, 1955.

*Primary Examiner*—Ronald L. Wibert
*Assistant Examiner*—Edward S. Bauer
*Attorney*—Glenn H. Bruestle ABSTRACT: A liquid crystal device comprises a liquid crystal composition sandwiched between conductive support plates wherein the liquid crystal composition is restricted to a specific area between the support plates by means of grooves in the support plates. The grooves which can be formed in many ways can be on one or both support plates and define a closed area into which the liquid is confined.

PATENTED AUG 17 1971 3,600,061

INVENTORS
George H. Heilmeier
and Louis A. Zanoni

BY

ATTORNEY

ELECTRO-OPTIC DEVICE HAVING GROOVES IN THE SUPPORT PLATES TO CONFINE A LIQUID CRYSTAL BY MEANS OF SURFACE TENSION

BACKGROUND OF THE INVENTION

This invention relates to devices having thin layers of liquid sandwiched between support plates and particularly to liquid crystal devices.

Liquid devices such as liquid crystal display devices and light valves are known in art. For example, U.S. Pat. No. 3,322,485 issued to Richard Williams describes a device comprising a layer of nematic liquid crystal composition sandwiched between conductive support plates. Devices described therein do not provide for the effects of expansion of the liquid crystal composition. For example, when operation of the device requires heating, the liquid crystal composition with the device tends to expand. If the device is sealed, this expansion can cause undue pressure and strain on the device which may result in cracking of the support plate or rupture of the seal. If the device is not sealed, expansion of the liquid crystal composition can result in loss of this material through the edges of the device or a change in the desired thickness of the liquid crystal layer. In addition, if the edges of the device are sealed so as to prevent entry of water vapor or oxidation of the liquid crystal composition, there may be a reaction between the liquid crystal composition and the sealant, hence it is preferred to separate these materials to insure that no such reaction occurs.

SUMMARY OF THE INVENTION

A device comprises a layer of a liquid sandwiched between support plates. The device includes means for confining the liquid to a particular region of the device.

It has been discovered that by providing means such as grooved support plates, the liquid of the device may be confined to a region separated from the edges of the device. In addition, the grooves also act to provide the liquid with space in which to expand upon heating of the device.

DETAILED DESCRIPTION OF THE INVENTION

Figure 2:
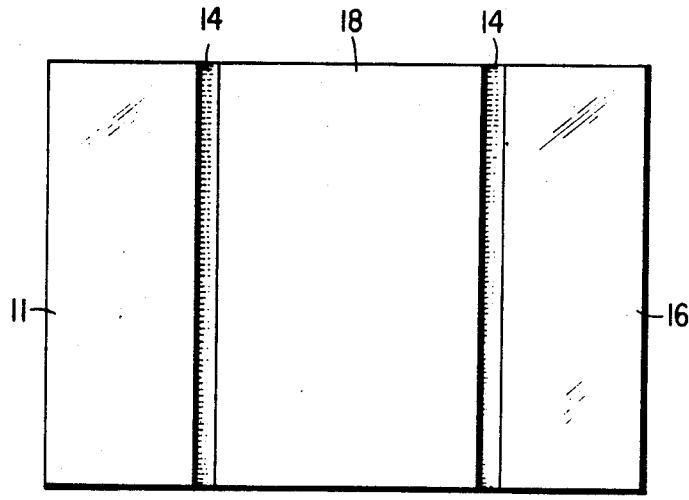
FIG. 2 is a plan view of a grooved support plate useful in the novel device.

An embodiment of a novel device 10 may be described with reference to FIG. 1. In the figure, there is shown a first transparent support plate 11 and a second transparent support plate 12 between which is sandwiched a liquid crystal layer 13. The liquid crystal layer may include, for example, liquid crystal materials which align in an electric field such as those disclosed in the aforementioned patent of R. Williams or liquid crystal compositions which exhibit dynamic scattering such as anisylidene-p-aminophenylacetate or other p-alkoxy-p-aminophenylcarboxylic acids alone or as mixtures. The first and second plates 11 and 12 each have a pair of parallel grooves 14 and 15 respectively on the inner surfaces 16 and 17 thereof. The grooves, as shown, extend across opposite edges of each support plate. However, the grooves may be made to terminate at a point prior to the edges. The first and second support plates 11 and 12 are arranged such that the grooves 14 on the first support plate 11 are orthogonal to the grooves 15 on the second support plate 12. The liquid crystal layer 13 is confined to the area defined by the pairs of grooves 14 and 15 and indicated by ABCD on the figure. The surface tension along the edges of the grooves 14 and 15 is what causes the liquid crystal layer 13 to be so confined.

The first and second support plates 11 and 12 each have a transparent conductive coating 18 and 19 on the inner surfaces thereof so as to be in contact with the liquid crystal layer 13. The device which modulates light due to a scattering effect, may be operated by applying a voltage across the liquid crystal layer 13 by means of a voltage source (not shown) connected to the transparent conductive coatings 18 and 19. The configuration of grooves as shown in FIG. 1 is preferred due to the ease in making contact with the conductive coatings on each support plate.

When the device is heated during operation, such as when the liquid crystal layer exhibits nematic properties at temperatures greater than room temperature, or when the response speed of the device is to be altered or due to variations in the ambient temperature, the liquid crystal layer can expand by entering the grooves. The grooves are preferably of sufficient depth to contain the entire liquid crystal layer. In this way, the liquid crystal layer is confined to the predetermined region and will not come in contact with any sealant that may be used, or cause undue stress or strain in such a device, or run out of the device if unsealed.

Figure 3:
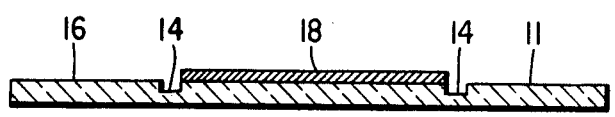
FIG. 3 is a side sectional view of the support plate of FIG. 1.
Figure 4:
FIGS. 4—7 indicate several possible cross-sectional configurations of grooves.
Figure 5:
Figure 6:
Figure 7:

The grooves of one support plate in the device 10 can be seen more clearly with respect to FIGS. 2 and 3. The cross-sectional shape of the grooves is not limited to that shown in FIG. 3 and many cross-sectional configurations for the grooves are feasible. FIG. 4 indicates several alternate cross-sectional configurations for the grooves.

Figure 1:
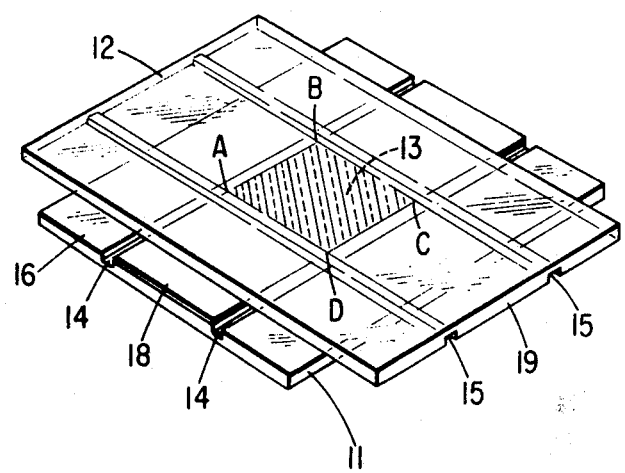
FIG. 1 is an elevational view of an embodiment of the invention.

Although it is preferred that each support plate has a pair of grooves, as shown with reference to FIG. 1, this is not essential. For example, one support plate may contain three grooves while the second support plate contains one groove, or, all grooves may be on the same support. Still other configurations are also suitable. For example a single circular or elliptical closed loop groove may be employed. When a closed groove is employed the conductive coating passes over the groove in order to provide for electrical contact. In this configuration it may be preferable to round off the edges of the groove to reduce the chance of a break in the conductor at a sharp edge.

The conductive coatings shown as continuous coatings in FIG. 1 may be patterned. For example, the conductive coating of each support plate may be in the form of strips which are all parallel to the grooves on that support plate. In this way, a cross-grid matrix can be formed when the support plates are positioned as in FIG. 1.

Since operation of a nematic liquid crystal devices requires a voltage across the liquid crystal layer, the device should provide means for making electrical contact to the conductive coating adjacent the liquid crystal composition. This may require a conductive path which traverses a groove and leads to an edge of a support plate so as to provide access for electrical contact with a wire to be attached thereto. There are many methods known in the art whereby such conductive paths can be formed. For example, such paths can be formed by the use of metal resinates, vacuum evaporation, electroless plating or vapor deposition techniques.

The grooves in the support plates can be formed by methods known in the glass art such as grinding, etching or sandblasting.

We claim:

1. An electric-optic liquid crystal device comprising a thin layer of a liquid crystal composition sandwiched between first and second support plates, said support plates having grooves so as to confine said liquid crystal composition to a particular region of said device by means of surface tension, said grooves defining and circumscribing said region.

2. The liquid crystal device recited in claim 1 wherein each support plate has two parallel spaced grooves therein and wherein the grooves in said first support plate are positioned so as to be transverse to grooves of said second support plate, at least one support plate being transparent and having a transparent conductive coating thereon.

3. The liquid crystal device recited in claim 1 including means for sealing the device so as to provide a hermetic seal for said liquid crystal composition, said sealing means being separated from said liquid crystal composition.

4. A liquid crystal device comprising a thin layer of a liquid crystal composition sandwiched between first and second support means, at least one of the said support means having grooves therein, said grooves confining said liquid crystal composition to a particular region of said device by means of surface tension, the perimeter of said region being defined by said grooves, and means for applying a voltage across said liquid crystal composition.